Nov. 23, 1937. H. F. KHOENLE 2,100,289

CASTING BAIT

Filed March 24, 1936

INVENTOR
HERMAN F. KHOENLE
BY Albert L. Ely
ATTORNEY

Patented Nov. 23, 1937

2,100,289

UNITED STATES PATENT OFFICE 2,100,289

CASTING BAIT

Herman F. Khoenle, Akron, Ohio, assignor to The Enterprise Manufacturing Company, Akron, Ohio, a corporation of Ohio Application March 24, 1936, Serial No. 70,626

6 Claims. (Cl. 43—46)

The present invention relates to artificial baits and particularly to a construction of baits of the casting type which possesses new and distinctive properties.

Specifically, the object of the invention has been to design a bait of this character which is adapted for use as a "popping" bait. In certain types of fishing it is the practice to cast the bait and then retrieve it by short choppy or jerky movements of the line which cause the bait to "pop," that is to say, it momentarily is immersed in the water and rises to the surface with a considerable commotion so as to imitate a struggling or crippled fish. This sort of bait casting is very alluring to game fish and is very effective in shallow water, above weed beds, or in short open spaces of water. The fisherman allows the bait to rest on the water momentarily, taking up the slack line. A short quick jerk of the rod causes the body to dive sharply and then return to the surface. This creates a swirl of water which attracts the fish. The operation is repeated with slight pauses until a strike is received, or until the line is retrieved for a second cast.

One of the desirable features of a "popping" bait is that it will complete a cycle of movement in a short space so that a fisherman may secure the largest number of "pops" in a given distance. In short open spaces of water in which the cast may be directed, the ability to secure a number of individual "pops" is advantageous. The particular design of the bait herein shown is superior to other baits which have been used for this type of casting as a greater number of "pops" may be secured in a short distance.

It is also a desirable feature in this type of casting that the bait shall make as much disturbance or commotion in the water as possible, as this increases the effectiveness of the bait.

It is also an advantage to have a "popping" bait which can also be used effectively for the usual bait casting operation and for trolling. Earlier forms of baits which are adaptable for "popping" have been devoid of any action if reeled in steadily in the usual fashion or when used as a trolling bait. These earlier forms of popping baits have had no wiggling or life-like action when drawn through the water steadily. It is one of the advantages of the construction shown and described herein that the bait has a life-like action when drawn steadily through the water and resembles a swimming minnow.

The improved bait, therefore, has the advantage of being an excellent "popping" bait and at the same time is practical and operative as a trolling or casting bait. The various features of construction which give rise to the advantages enumerated are shown in the drawing and will be set forth in full in the description, but it will be understood that the showing is for the purpose of illustrating the best known and preferred form of the invention and is subject to change and modification. The construction of the improved bait has been the successful outcome of development work which has been undertaken in order to arrive at a bait which will combine all of the desirable properties of a "popping" bait, without sacrificing its utility as a trolling or casting bait.

In the drawing in which the best known form of the invention is shown:

Figure 1:
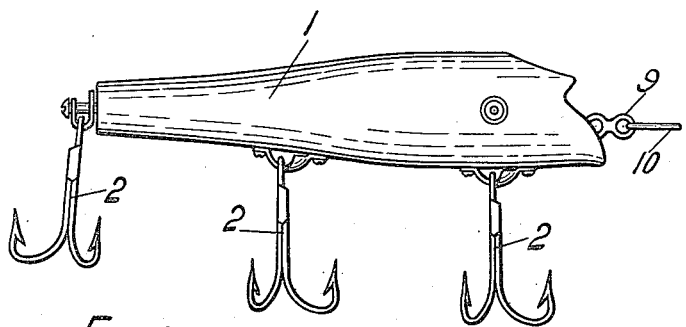
Figure 1 is a side elevation of the improved bait.
Figure 2:
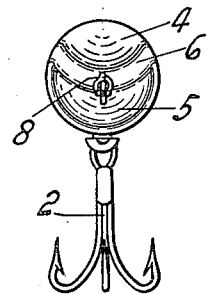
Figure 2 is a view looking at the front end of the bait.
Figure 3:
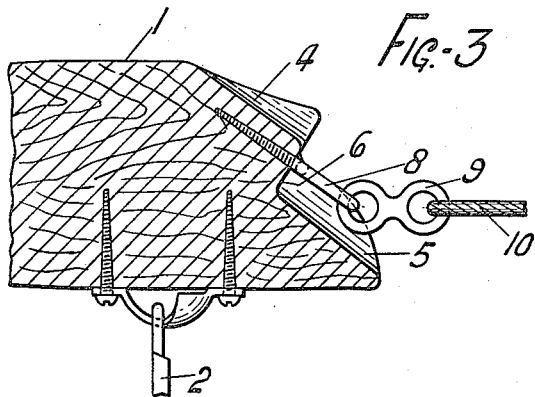
Figure 3 is an enlarged cross-section taken at the head of the bait.
Figure 4:
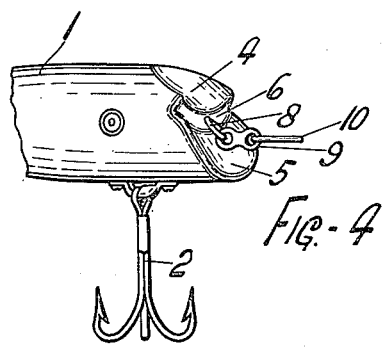
Figure 4 is a perspective view of the head of the bait.

The bait shown herein comprises a usual or standard form of bait body 1 which may be of any preferred type, that shown herein being a wooden body rounded in cross-section and tapered as shown, although this configuration of the body is not essential. To the body and at the tail are attached the usual or standard forms of swinging gang hooks 2.

The forward or head end of the bait is cut away on a downwardly and forwardly inclined plane so that when drawn through the water the bait will dive or dip downwardly below the surface. The head of this bait, however, is formed with two separate and distinct surfaces, one above the other, the upper surface being indicated by the numeral 4 and the lower by the numeral 5, so that the surfaces are spaced apart by a step-down wall or ledge 6 which is undercut as shown. The face of the undercut is inclined downwardly and rearwardly so as to form the continuous undercut or pocket extending across the head of the bait. The lower surface 5 is of considerably greater extent than the upper surface 4. Each of the inclined surfaces is hollowed out or concaved as shown in the drawing. The wall 6 is preferably flat across the bait.

Pull is exerted on the bait body, preferably below the center line. The point at which the pull is exerted is an important element of the design and the bait is less effective if the pull is at any other point. For this purpose, a screw eye 8 is embedded in the wall 6 and extends downwardly and forwardly over the lower inclined surface 5. A double link 9 is carried in the outer end of the screw eye 8, to which the line 10 is attached.

Figure 5:
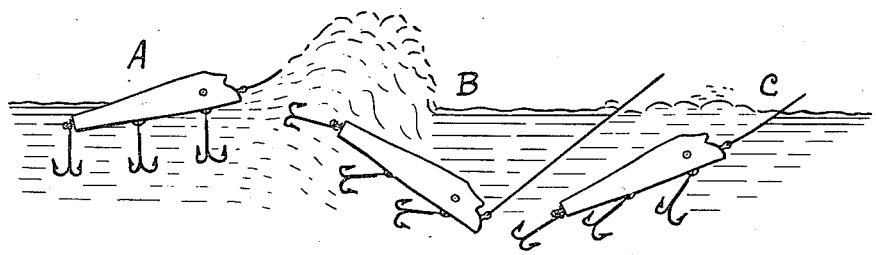
Figure 5 is a view illustrating the manner in which the bait operates, showing three positions of the bait when it is used as a "popping" bait.

Figure 5 illustrates the operation of the bait in "popping," the first position A representing the manner in which the bait floats at rest on the surface of the water. When the line is jerked, the head of the bait makes a splash in the water and the bait dives downwardly, as shown at B, immediately rising and creating a further swirl in the water as the bait passes to the surface, as shown at C. The entire action takes place in a very short distance so that the fisherman can secure the greatest possible number of "pops" in a short space. The shape of the forward end of the bait causes it to dive sharply and to rise to the surface with the maximum commotion.

When the bait is drawn in steadily, the inclined surfaces cause the bait to travel below the surface of the water and the undercut portion, in combination with the concave character on the two inclined surfaces, set up a peculiar wiggling motion, simulating the swimming of a fish.

The concave surfaces are preferably cut upon the same radius, which makes the wall 6 deeper at the center of the bait. This construction improves the action of the bait as the deeper pocket in the center seems to give a more pronounced action.

What is claimed is:

1. An artificial bait for use in trolling or "popping" comprising a bait body the forward end of which is formed with a plurality of downwardly and forwardly inclined surfaces, separated by an undercut notch extending across the end of the bait, the said surfaces being concaved transversely of the body.

2. An artificial bait adaptable for trolling or "popping" comprising a bait body having a forward end formed with a plurality of transversely concaved surfaces of the same radius extending in a general forwardly and downwardly inclined direction, said surfaces being separated by a rearwardly inclined undercut wall.

3. An artificial bait adaptable for trolling or "popping" comprising a bait body having a forward end formed with two transversely concaved surfaces extending in a general forwardly and downwardly inclined direction, said surfaces being separated by a rearwardly inclined undercut wall, and a line attachment secured to the wall and projecting forwardly over the lower concaved surface.

4. An artificial bait adaptable for trolling or "popping" comprising a bait body having a forward end formed with two transversely concaved surfaces extending in a general forwardly and downwardly inclined direction, said surfaces being separated by a rearwardly inclined undercut wall, and a line attached to the bait at a point below the central plane of the bait.

5. An artificial bait for trolling or "popping" comprising a body having its forward end formed with two spaced surfaces forwardly and downwardly inclined, each of said surfaces being concaved transversely of the body, the lower surface being of greater extent than the upper surface, and a step connecting the two surfaces and presenting a flat wall to the water.

6. An artificial bait for trolling or "popping" comprising a body having its forward end formed with two spaced surfaces forwardly and downwardly inclined, each of said surfaces being concaved transversely of the body, the lower surface being of greater extent than the upper surface, a step connecting the two surfaces and presenting a flat wall to the water, and means for attaching a line projecting from the step.

HERMAN F. KHOENLE.